United States Patent [19]
Gosling

[11] Patent Number: 5,238,511
[45] Date of Patent: Aug. 24, 1993

[54] DOUBLE C-SHAPED CLAMP

[75] Inventor: Addick A. Gosling, Frauenfeld, Switzerland

[73] Assignee: Everts en Van der Weyden Exploitatiemaatschappij, The Hague, Netherlands

[21] Appl. No.: 831,274

[22] Filed: Feb. 4, 1992

[51] Int. Cl.⁵ ............................................. C21D 8/00
[52] U.S. Cl. ................................... 148/624; 148/653
[58] Field of Search ............... 148/908, 580, 624, 653; 72/384, 349; 238/352

[56] References Cited

U.S. PATENT DOCUMENTS 4,025,044  5/1977  Goderbauer .................. 238/349

5,100,482  3/1992  Tanaka et al. .................. 148/908

*Primary Examiner*—Deborah Yee
*Attorney, Agent, or Firm*—Christensen, O'Connor, Johnson & Kindness

[57] ABSTRACT

A double C-shaped, resilient, biased clamp for fixing a track rail to a support is manufactured by bending a piece of bar material to a double C-shape. Thereafter the clamp is hardened and heat treated. Prior to bending heating takes place at approximately 1200° C. and finishing takes place directly thereafter by a starting temperature of 900°-1000° C. By this a spring of smaller dimensions is obtained. However, with almost the same properties as the clamps as produced previously.

2 Claims, 1 Drawing Sheet

DOUBLE C-SHAPED CLAMP

FIELD OF THE INVENTION

The invention relates to a method for manufacturing a double C-shaped clamp and a clamp manufactured according to the method.

BACKGROUND OF THE INVENTION

Such a method and clamp is known from the Netherlands patent 163.277[1]. With the known method it is possible to obtain a clamp that suffices well in practice, having a radius of the C of 25 mm and a clamping force in the order of magnitude of 1000 Kp. The spring deflection amounts to about 10 mm.

[1] Throughout this disclosure, "Netherlands patent 163.277" refers to U.S. Pat. No. 4,025,044, the disclosure in the specification and drawings of which is hereby incorporated by reference herein.

In some conditions it is required to manufacture a spring of smaller dimensions. In the case of small rails for instance it can occur in some conditions that the wheels of a railway vehicle come into contact with the spring clamp. A smaller clamp is also desired in the case of special rails, for instance a grooved track.

SUMMARY OF THE INVENTION

It is the object of the invention to provide a clamp of smaller dimensions than was possible with the known method but having nevertheless almost the same properties.

This is achieved according to the invention in that, prior to bending, heating is carried out to approximately 1200° C. and finishing takes place directly thereafter at a starting temperature of 900°–1000° C.

DETAILED DESCRIPTION OF THE INVENTION

Figures 1, 2:
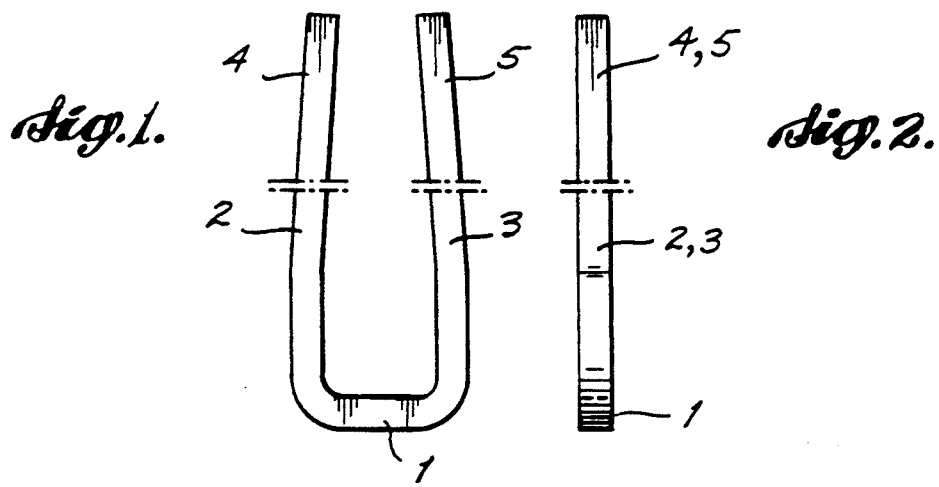
FIG. 1 shows a clamp according to the invention in the first stage of manufacture.
FIG. 2 is a side elevation of the clamp of FIG. 1.
Figures 3, 4:
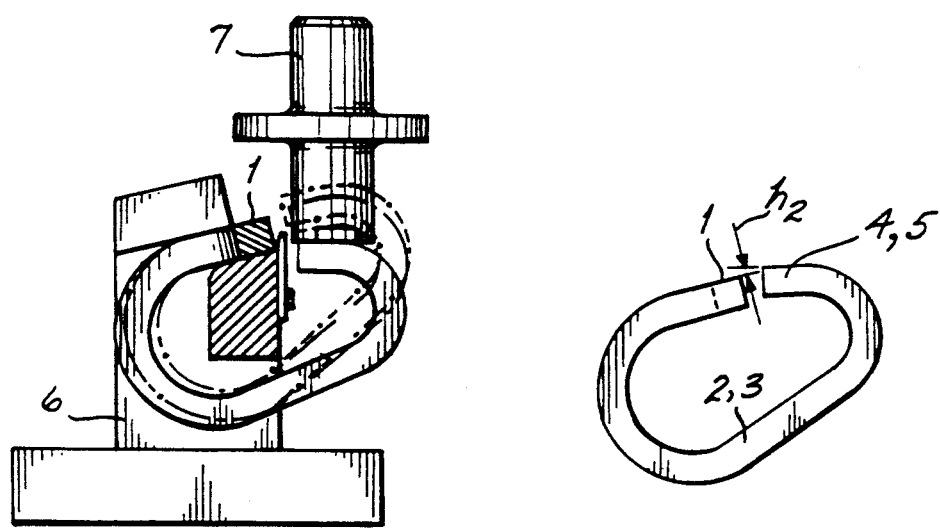
FIG. 3 shows a clamp during forming to the correct shape.
FIG. 4 shows the finished clamp.
Figures 5, 6:
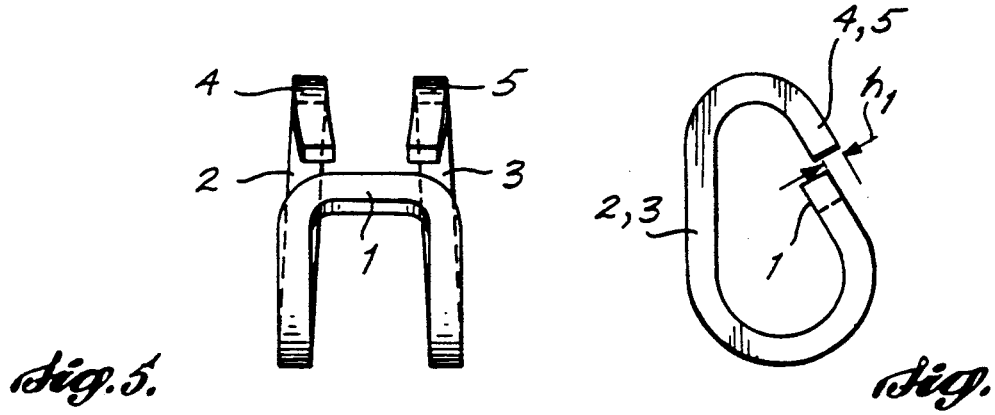
FIG. 5 shows the clamp after the second stage of manufacture.
FIG. 6 is a side elevational view of the clamp of FIG. 5 and illustrating its generally C-shaped form.

The clamp is formed from bar material which is first bent into the form of a U. FIG. 1 shows the clamp in a direction perpendicular to the plane of the U and FIG. 2 shows the clamp in the direction of the plane of the U. The web 1 and limbs 2 and 3 will be seen. After the bar has been bent into the form of a U, the free ends 4, 5 of the limbs 2 and 3 and the part forming the web 1 of the U are so bent over as to produce the form generally C-shaped shown in FIGS. 5 and 6. The clamp is then subjected to a heat treatment. It is first hardened and then annealed. The ends 4 and 5 are offset by a distance h with respect to the web 1 as shown in FIG. 6, the ends thus being laterally offset from the predetermined disposition thereof which is illustrated in FIG. 4. The significance of this will be explained hereinafter.

FIG. 3 shows the clamp of FIG. 2 clamped in a holder 6. That part of the clamp adjacent the web 1 is fixed in the same way as the clamp is retained in a holder in operation. A punch 7 cooperates with the free end of the clamp formed by the ends 4 and 5 of the limbs 2 and 3. The clamp initially has the shape shown in FIG. 6. The punch 7 presses the clamp out of the dotted-line position into the solid-line position, permanent deformation occurring in these conditions. The pressure is then removed from the clamp, which returns to the shape shown in dot-dash lines. The punch is then again moved downwards and the clamp is pressed in further than the position shown in solid lines. In these conditions there is again a permanent deformation, and when the punch 7 is removed the clamp assumes the shape shown in FIG. 4. In this position the distance between the web 1 and the ends 4, 5 of the clamp is denoted by $h_2$. The cold deformation of the clamp from the shape shown in FIG. 6 to the shape shown in FIG. 4 takes place in two steps. The pressure is removed from the clamp after each permanent deformation. The clamp may also be permanently deformed in more steps, a small permanent deformation being produced in each step. The pressure must be removed from the clamp after each permanent deformation before any further deformation is produced. With the deformation method described, a very small tolerance is obtained for the final dimensions of the clamp, and the clamping force is accurately predetermined and constant during operation.

In the known method described above the clamp was cooled after the bending process to about room temperature before finishing took place. During this cooling in the air the material underwent a change which is avoided in accordance with the method according to the present invention.

It has been found that with the method according to the present invention a spring can be obtained with a smaller radius of curvature of the C than was deemed possible up to the present, while the clamping properties, 10 mm spring deflection and a clamping force of 1000 Kp remain preserved.

This is achieved according to the invention in that, prior to bending, heating is carried out to approximately 1200° C. and finishing takes place directly thereafter at a starting temperature of 900°–1000° C. The present invention is a method for manufacturing a double C-shaped, resilient, biased clamp for fixing a track rail to a support by bending a piece of bar material to a double C shaped, subjecting the clamp to a hardening and heat treatment and finally deforming the clamp, characterized in that prior to bending heating is carried out to approximately 1200° C. and finishing takes place directly thereafter at a starting temperature of 900°–1000° C. The finishing preferably takes place in a continuous furnace.

With this small clamp rails can therefore be clamped in the same manner as with the larger clamp known up until now.

In order to arrive at the method according to the invention, problems had to be overcome which occurred during reducing of the known clamp. Steps had to be taken for instance to control the cooling speed since the smaller clamp has less material than a larger one. Due to the smaller radius of curvature the elasticity curve is steeper and the spring deflection smaller. With the use of the known method for manufacturing smaller clamps the clamping force of 1000 Kp is achieved at a greater hardness, which results in a smaller spring deflection.

According to the invention these drawbacks are overcome and the smaller spring clamp preserves the favourable properties of the larger dimensioned clamp.

Finishing preferably takes place in a continuous furnace.

The embodiments of the invention in which an exclusive property or privilege is claimed are defined as follows:

1. In a method of making a clamp for securing a rail on a support, which comprises the steps of:
   a. bending a length of bar material into a U-shaped configuration;
   b. bending the U-shaped configuration of step (a) transversely of the plane of such configuration to define a generally C-shaped clamp in which the free ends of the C-shape are laterally offset, in the plane of the C-shape, from a predetermined final disposition thereof;
   c. subjecting the C-shaped clamp to hardening and heat treatment;
   d. fixedly holding one end of the C-shaped clamp while exerting a first force against the other end of the clamp in a direction and of such magnitude as to effect a continuous movement of said other end and produce a permanent deformation of said ends toward said final disposition thereof, and then releasing said force to allow said ends of the clamp to spring back to that permanently deformed position effected by said first force; and
   e. repeating step (d) at least once with an increased force to effect further permanent deformation of said ends to said final disposition thereof, the improvement comprising subjecting the C-shaped clamp to hardening and heat treatment at about 1200° C. in step (c) and thereafter starting the deformation in step (d) at a temperature of 900°–1000° C.

2. The improved method of claim 1, wherein the deformation in steps (d) and (e) takes place in a continuous temperature furnace.

* * * * *

UNITED STATES PATENT AND TRADEMARK OFFICE
CERTIFICATE OF CORRECTION

PATENT NO. : 5,238,511
DATED : August 24, 1993
INVENTOR(S) : Addick A. G. van Hees It is certified that error appears in the above-indentified patent and that said Letters Patent is hereby corrected as shown below:

| COLUMN | LINE | |
|---|---|---|
| 1 | 12 | after "clamp" insert --(or clip)-- |
| 2 | 25 | "above" should read --above,-- |

Title page, item [75] "Inventor"   "Addick A. Gosling" should read --Addick A. G. van Hees-- item [19] "Gosling" should read --van Hees--

Signed and Sealed this

Twelfth Day of April, 1994

Attest:

BRUCE LEHMAN

*Attesting Officer*   Commissioner of Patents and Trademarks